United States Patent
Liu et al.

(10) Patent No.: US 7,904,954 B2
(45) Date of Patent: Mar. 8, 2011

(54) METHOD, DEVICE AND SECURITY CONTROL SYSTEM FOR CONTROLLING COMMUNICATION BORDER SECURITY

(75) Inventors: Lifeng Liu, Shenzhen (CN); Zhibin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 719 days.

(21) Appl. No.: 11/943,496

(22) Filed: Nov. 20, 2007

(65) Prior Publication Data

US 2008/0098473 A1    Apr. 24, 2008

Related U.S. Application Data

(63) Continuation of application No. PCT/CN2006/001779, filed on Jul. 20, 2006.

(30) Foreign Application Priority Data

Nov. 30, 2005    (CN) .............................. 200510101956

(51) Int. Cl.
*G06F 7/04* (2006.01)
*G06F 15/16* (2006.01)
*G06F 17/30* (2006.01)
*G06F 9/00* (2006.01)
*G06F 17/00* (2006.01)
*H04L 29/06* (2006.01)
*G06F 15/173* (2006.01)

(52) U.S. Cl. .................. 726/13; 726/4; 726/11; 726/22; 709/223

(58) Field of Classification Search .................. None
See application file for complete search history.

(56) References Cited

U.S. PATENT DOCUMENTS

| 6,243,815 | B1 * | 6/2001 | Antur et al. ..................... 726/11 |
| 7,216,229 | B2 | 5/2007 | Hu |
| 7,626,979 | B1 * | 12/2009 | Bugenhagen et al. ........ 370/352 |
| 2003/0154400 | A1 * | 8/2003 | Pirttimaa et al. |

(Continued)

FOREIGN PATENT DOCUMENTS

CN    1 416 245    *    5/2003

(Continued)

OTHER PUBLICATIONS

"Who Ensures VoIP Security," May 9, 2005, China Academic Journal Electronic Publishing House, ©1994-2009, http://www.enki.net (English Abstract).

(Continued)

*Primary Examiner* — Shin-Hon Chen
(74) *Attorney, Agent, or Firm* — Slater & Matsil, L.L.P.

(57) ABSTRACT

The present invention provides a method, a device and a system for controlling VoIP border security. The system includes: a border security controller, which includes two dynamic information tables, an active session information table and a registered user information table, acting as the basis of security control; and a security policy server, in communication with the border security controller, adapted to provide a security policy to the border security controller and check the security of a signaling packet forwarded by the border security controller. The border security control system first checks the security and processes the packets of a user datagram received according to the active session information table and the registered user information table, and allows a packet which passed the security processing to pass, and then performs protocol processing on the media packet and signaling packet which are allowed to pass.

13 Claims, 2 Drawing Sheets

U.S. PATENT DOCUMENTS

| | | |
|---|---|---|
| 2003/0236898 A1 | 12/2003 | Hu |
| 2004/0071130 A1* | 4/2004 | Doerr et al. .................. 370/352 |
| 2005/0028013 A1* | 2/2005 | Cantrell et al. ............... 713/201 |
| 2005/0076108 A1* | 4/2005 | Li et al. ......................... 709/223 |
| 2006/0041935 A1* | 2/2006 | Conley et al. .................. 726/11 |
| 2006/0285493 A1* | 12/2006 | Manuja et al. ................ 370/235 |
| 2006/0288411 A1* | 12/2006 | Garg et al. ...................... 726/22 |
| 2007/0076690 A1* | 4/2007 | Dyck et al. .................... 370/352 |
| 2007/0083927 A1* | 4/2007 | Swaroop ......................... 726/22 |
| 2007/0118894 A1* | 5/2007 | Bhatia ............................. 726/13 |
| 2007/0214501 A1* | 9/2007 | Muramoto et al. ............. 726/11 |

FOREIGN PATENT DOCUMENTS

| | | | |
|---|---|---|---|
| CN | 1416245 A | | 5/2003 |
| CN | 1 534 933 | * | 10/2003 |
| CN | 1534933 A | | 10/2004 |
| CN | 1 567 808 | * | 1/2005 |
| CN | 1 581 795 | * | 2/2005 |
| CN | 1604589 A | | 4/2005 |
| EP | 1592189 A1 | | 2/2005 |
| WO | 2007/062257 A1 | * | 6/2007 |

OTHER PUBLICATIONS

English Translation of the Written Opinion of the International Searching Authority, PCT/CN2006/001779, Date of mailing Nov. 9, 2006, 4 pages.

Chinese office action, Chinese application No. 200510101956.1 with partial English translation, date of mailing Apr. 3, 2009, 6 pages.

Chinese office action, Chinese application No. 200680012270.8 with partial English translation, date of mailing Sep. 25, 2009, 6 pages.

"Who Protects the Security of VoIP," dated May 9, 2005, 1994-2009 China Academic Journal Electronic Publishing House, http:/www.enki.net, with partial English translation, 3 pages.

* cited by examiner

US 7,904,954 B2

METHOD, DEVICE AND SECURITY CONTROL SYSTEM FOR CONTROLLING COMMUNICATION BORDER SECURITY

The present application is a continuation of PCT application PCT/CN2006/001779, filed on Jul. 20, 2006, entitled "A SECURITY CONTROL METHOD, DEVICE FOR THE COMMUNICATION BORDER AND THE SECURITY CONTROL SYSTEM", which is incorporated by reference herein in its entirety.

FIELD OF THE INVENTION

The present invention relates to the technical field of communications, in particular, to a method, a device and a system for controlling communication border security.

BACKGROUND OF THE INVENTION

In the disposition of Next Generation Network (NGN) and other Voice on IP (VoIP) networks, a Session Border Controller (SBC) is usually employed. The SBC may be disposed to the access layer of an NGN or a VoIP network for processing the VoIP call of all the users. It is a common method for protecting an NGN core network from being attacked by performing security control via the SBC. By performing a session control on the network border via the SBC, capabilities such as Quality of Service (QoS), call admission, and Network Address Translation (NAT) traversal may be provided for the whole VoIP network. The capability of the security control may also be provided via the SBC, so that the NGN core network may be protected from being directly attacked by a malicious user. A conventional method for controlling the security of the VoIP network border is implemented based on signaling and media proxy. The SBC is a processing device with a complex signaling protocol stack. During the resolving process of a packet, the packet to be resolved first needs to enter a protocol stack. When the packet has a defect, for example, if a cross circulation exists in the packet, the SBC may be broken down due to the malformed packet, so that the SBC may be attacked. Therefore, the main disadvantage of the existing SBC lies in that the security can not be ensured and is susceptible to be attacked by a malicious resource occupation.

SUMMARY OF THE INVENTION

The present invention provide a method, a device and system for controlling communication border security, which may prevent malicious network attacks and realize a well self-protection.

A method for controlling communication border security according to the present invention includes: performing security processing on a data packet received; and performing protocol processing on the data packet if the data packet passes the security processing.

Wherein, the data packet includes media packet and signaling packet.

Specifically, the method performs the following security processing on the data packet received: determining a type of the data packet; if the data packet is a media packet, then querying whether a corresponding active session record exists in an active session information table, if yes, the media packet passes the security processing; otherwise, the media packet is discarded; if the data packet is a signaling packet, then querying a registered user information table to determine whether the signaling packet is a signaling packet sent by a registered user, if yes, the signaling packet passes the security processing.

Or, the security processing is performed on the data packet received in the following way: determining the type of the data packet; if the data packet is a media packet, then querying whether a corresponding active session record exists in an active session information table, if yes, the media packet passes the security processing; otherwise, the media packet is discarded; if the data packet is a signaling packet, then querying a registered user information table to determine whether the signaling packet is a signaling packet sent by a registered user and performs integrity detection and source authentication on the signaling packet sent by a registered user, if the signaling packet is a signaling packet sent by a registered user and passes the authentication, the signaling packet passes the security processing; otherwise, the signaling packet is discarded.

The method further includes: performing signaling security detection and terminal validity detection on a signaling packet sent by an unregistered user, if the detection is passed, the signaling packet passes the security processing; otherwise, the signaling packet is discarded.

After protocol processing is performed on the media packet, the active session information table is updated according to the processing result.

In addition, the method further includes: updating the registered user information table according to the processing result, after the protocol processing is performed on the signaling packet.

A device for controlling communication border security according to an embodiment of the present invention, including: a detecting unit adapted to perform security processing on a data packet received; and a protocol processing unit adapted to perform protocol processing on a data packet which passes detection.

Wherein, the data packet includes media packet and signaling packet.

The detecting unit includes: a first information unit adapted to store an active session information table; a second information unit adapted to store a registered user information table; and a first processing unit adapted to determine a type of a data packet; if the data packet is a media packet, the detecting unit queries whether a corresponding active session record exists in an active session information table, if yes, the media packet passes the security processing; otherwise, the media packet is discarded; if the data packet is a signaling packet, the detecting unit queries a registered user information table to determine whether the signaling packet is a signaling packet sent by a registered user, if yes, the signaling packet passes the security processing.

The detecting unit may also include the following units: a first information unit adapted to store an active session information table; a second information unit adapted to store a registered user information table; and a first processing unit adapted to determine the type of a data packet; if the data packet is a media packet, the detecting unit queries whether a corresponding active session record exists in an active session information table, if yes, the media packet passes the security processing; otherwise, the media packet is discarded; if the data packet is a signaling packet, the detecting unit queries a registered user information table to determine whether the signaling packet is a signaling packet sent by a registered user and performs integrity detection and source authentication on the signaling packet sent by a registered user, if the signaling packet is a signaling packet sent by a registered user and passes the authentication, then the signaling packet passes the security processing; otherwise, the signaling packet is discarded.

The detecting unit may also include at least one of the following units: a second processing unit adapted to perform signaling security detection and terminal validity detection on a signaling packet sent by an unregistered user, if the detection is passed, the signaling packet passes the security processing; otherwise, the signaling packet is discarded; a first updating unit adapted to update an active session information table according to the processing result for a media packet output from the protocol processing unit; and a second updating unit adapted to update a registered user information table according to the processing result for a signaling packet output from the protocol processing unit.

A system for controlling communication border security according to an embodiment of the present invention, including: a border security controller arranged between a soft switching or other communication servers and a terminal, wherein the border security controller includes: a detecting unit adapted to perform security processing on a data packet received; and a protocol processing unit adapted to perform protocol processing on a data packet which passes the detection.

The system further includes: a security policy server, in communication with the border security controller, adapted to provide a security policy to the border security controller.

Wherein, the data packet includes media packet and signaling packet.

The detecting unit may also include the following units: a first information unit adapted to store an active session information table; a second information unit adapted to store a registered user information table; and a first processing unit adapted to determine the type of a data packet; if the data packet is a media packet, the detecting unit queries whether a corresponding active session record exists in an active session information table, if yes, the media packet passes the security processing; otherwise, the media packet is discarded; if the data packet is a signaling packet, the detecting unit queries a registered user information table to determine whether the signaling packet is a signaling packet sent by a registered user, if yes, the signaling packet passes the security processing.

The detecting unit may also include the following units: a first information unit adapted to store an active session information table; a second information unit adapted to store a registered user information table; and a first processing unit adapted to determine the type of a data packet; if the data packet is a media packet, the detecting unit queries whether a corresponding active session record exists in an active session information table, if yes, the media packet passes the security processing; otherwise, the media packet is discarded; if the data packet is a signaling packet, the detecting unit queries a registered user information table to determine whether the signaling packet is a signaling packet sent by a registered user and performs integrity detection and source authentication on the signaling packet sent by a registered user, if the signaling packet is a signaling packet sent by a registered user and passes the authentication, the signaling packet passes the security processing; otherwise, the signaling packet is discarded.

In the system, the detecting unit may also include at least one of the following units: a second processing unit adapted to perform signaling security detection and terminal validity detection on a signaling packet sent by an unregistered user, if the detection is passed, the signaling packet passes the security processing; otherwise, the signaling packet is discarded; a first updating unit adapted to update an active session information table according to the processing result for a media packet output from the protocol processing unit; and a second updating unit adapted to update a registered user information table according to the processing result for a signaling packet output from the protocol processing unit.

Moreover, the border security controller and the security policy server are arranged separately or integrally.

The invention has the following advantages: because a datagram checking mechanism based on user information is used in embodiments of the present invention, the border will prevent the datagrams of all the unregistered users from entering the core network, so that the attack initiated by an illegal user can be avoided effectively; because in the method according to embodiments of the present invention, packet determination is performed first and then protocol processing is performed, the possibility to initiate an attack on the present device can be lowered effectively; and embodiments of the present invention also perform a special security inspection on a registered signaling packet, so that an anonymous attack via a registered signaling can be prevented.

DETAILED DESCRIPTION OF THE EMBODIMENTS

The present invention will now be further described in detail according to the drawings and embodiments of the present invention.

Figure 1:
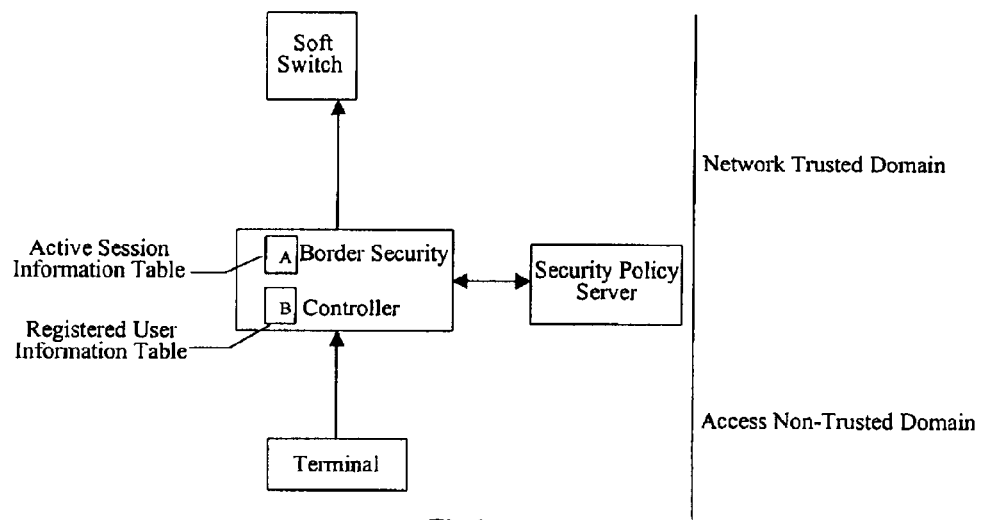
FIG. 1 is a schematic diagram of a system for controlling the communication border security according to one embodiment of the present invention.

An SBC is also configured between a soft switching and a terminal in the conventional art. The SBC mainly has the functions of processing a signaling and media and performing a protocol processing on a media flow and a signaling packet. In an embodiment of the present invention, in order to prevent a device with a related signaling protocol stack in a protected network and a controller from a security threat caused by a security loophole, the border security control system as shown in FIG. 1 is employed. The system includes a border security controller. In comparison with a controller of the conventional art, the border security controller, as a device for performing the security control, has a security control function in addition to the original protocol processing functions. The border security controller includes two dynamic information tables, an active session information table and a registered user information table, acting as an important basis of the security control. The active session information table (information table A) is used for recording information related to current session, including media channel address, call ID, calling number, calling ID, called number and called ID. This information table is updated via a session signaling. The contents in the information table may be changed each time when a session starts and ends or times out. This information table is the main basis to determine whether to allow a media flow to pass. The registered user information table (information table B) is used for recording information related to a successfully registered user, including user IP address, user ID and security associated information. This information table is updated via registered signaling and timeout. The contents in the information table will be changed once a user registers and deregisters successfully and a timeout occurs. This information table is the main basis to determine whether to accept a signaling.

The system further includes: a security policy server, in communication with the border security controller, adapted to provide a security policy to the border security controller and interact with the border security controller, so that the object of the security control may be attained. The security policy server is mainly used to check the security of a signaling forwarded by the border security controller, or obtain the security mechanism supported by a terminal via a signaling, so that a processing policy may be provided to the border security controller. The border security controller and the security policy server may be arranged integrally, for example, a security policy serving module may be added to the border security controller; or the border security controller and the security policy server may be arranged separately. The advantages of separate arrangement are as follows. On each access point, the security policy server may be disposed distributively or may serve a plurality of border security controllers simultaneously, so that the load flow may be distributed. When failure occurs on a part of the border security controller and the security policy server and causes to fail, the functions of other parts will not be influenced. For example, when the security policy server fails, the border security controller is in a normal state, and the existing users may communicate as usual. Although, a new user may not register for the communication.

The method for controlling the border security according to an embodiment of the present invention is different from that of the conventional art. In the method according to an embodiment of the present invention, the border security control system first performs the security processing on the packet of a received user datagram, and then performs the protocol processing on the data packet which has passed the security processing. For example, the process in which the protocol processing is performed on a media packet and a signaling packet will now be described by referring to the embodiment shown in FIG. 2. The embodiment shown in FIG. 2 includes the following steps.

A1: The information table A and information table B are initialized, a user datagram is received, and the packet type of the datagram is determined.

A2: For a media packet, it is queried whether a corresponding active session record exists in the active session information tables, i.e. the information table A, if no related record exists, the media packet is discarded; otherwise, the media packet is passed, and a protocol processing is performed on the media packet.

A31: For a signaling packet, it is determined whether the signaling packet is a signaling packet sent from a registered user by querying a registered user information table, i.e. the information table B, if the signaling packet is sent from a registered user, an integrity detection and source authentication are performed on the signaling packet.

A32: For a signaling packet sent from a registered user and has passed the source authentication and integrity detection, the signaling protocol processing is performed, and the active session information table is updated dynamically according to the processing result; if the signaling packet is not sent from a registered user, the signaling packet is discarded.

A4: For a signaling packet sent from an unregistered user, a border security controller forwards the signaling packet to the security policy server for the signaling security inspection and the terminal validity inspection. The security policy server determines whether allow a user to register according to the security of the signaling packet and whether the terminal has a mandatory security mechanism, and then the security policy server returns an inspection result. Thus, the signaling packet has not passed the security inspection will be discarded.

A51: For a signaling packet whose security is assured, the border security controller allows the signaling packet to pass, and the signaling protocol processing is performed.

A52: A soft switching returns the registration result to the terminal, and dynamically updates the registered user information table according to the registration result.

Figure 2:
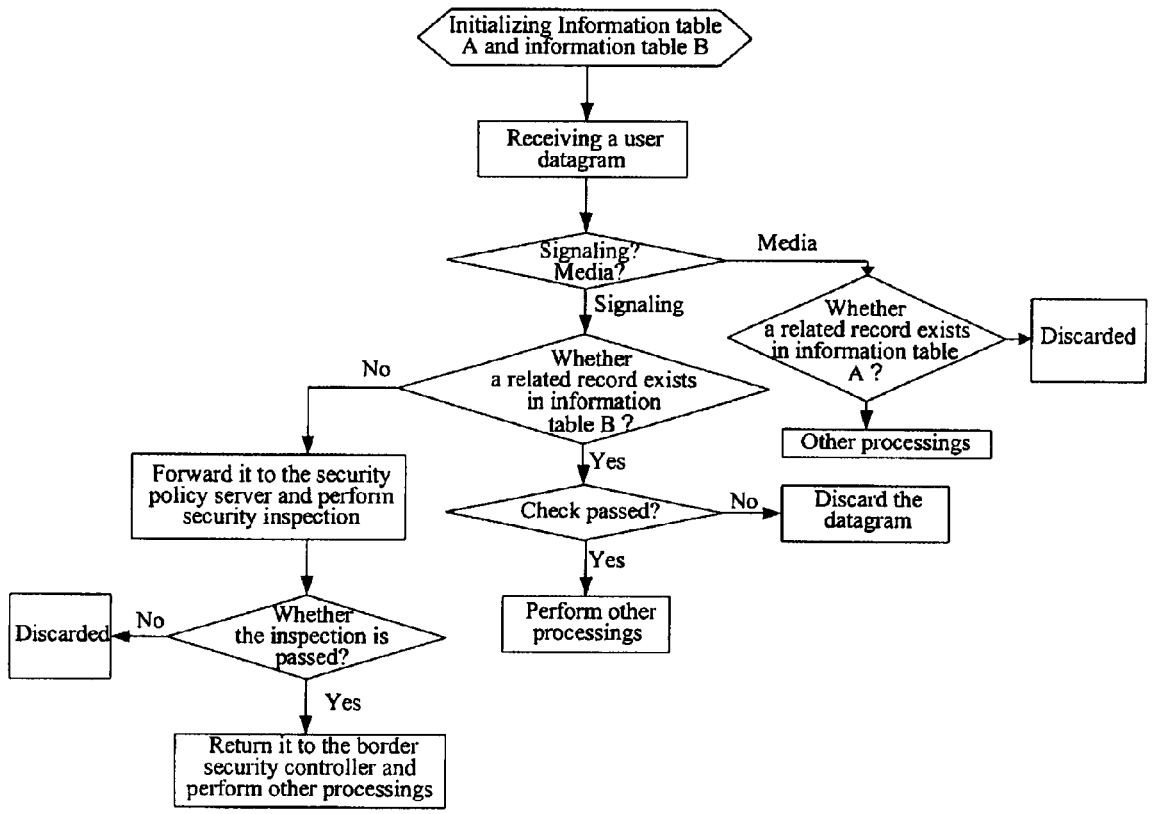
FIG. 2 is a flow chart of a method for controlling the communication border security according to one embodiment of the present invention.

In the embodiment shown in FIG. 2, information table A should be updated each time when a user registers or deregisters successfully, and information table B should be updated once a new session is established or an existing session is terminated. Each record in information tables A and B should have a function of timeout update. If information table A and/or information table B are not updated, the communication border security control performance of the system may be influenced. Therefore, compared with the embodiment in which information table is not updated, the performance of the system may be improved when one or both of the information tables are updated. The embodiment shown in FIG. 2 is applicable for the border security control for all VoIP applications.

Figure 3:
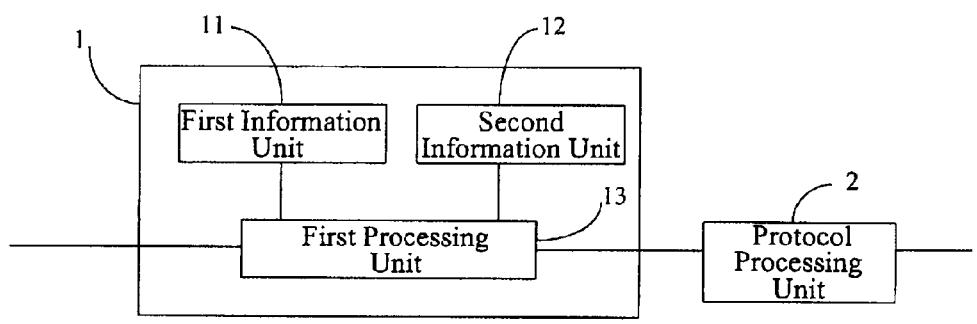
FIG. 3 is a block diagram of a device for controlling the communication border security according to one embodiment of the present invention.

FIG. 3 discloses a device for controlling the communication border security, including: a detecting unit 1, adapted to perform the security processing on a received data packet; and a protocol processing unit 2, adapted to perform the protocol processing on a data packet has passed the detection. The device will be described by taking the device shown in FIG. 3 as an example, wherein the processed data packet is one of a media packet and a signaling packet.

In FIG. 3, the detecting unit 1 includes: a first information unit 11 adapted to store an active session information table; a second information unit 12 adapted to store a registered user information table; and a first processing unit 13 adapted to determine the type of a data packet. The first processing unit 13 determines the type of a received data packet. If the data packet is a media packet, the first processing unit 13 queries whether a corresponding active session record exists in the active session information table; and if no related record exists, the media packet is discarded, and if the related record exists, the first processing unit 13 performs the protocol processing on the media packet. If the data packet is a signaling packet, the first processing unit 13 queries a registered user information table to determine whether the signaling packet is a signaling packet sent by a registered user, if the signaling packet is sent by a registered user, the signaling packet passes the security processing.

In another embodiment of the present invention, the first processing unit 13 not only determines whether a received signaling packet is a signaling packet sent by a registered user, but also performs the integrity detection and the source authentication on the signaling packet. Only a signaling packet which is sent by the registered user and passes the integrity detection and source authentication is regarded as the signaling packet has passed the security processing; otherwise, the signaling packet is discarded.

Figure 4:
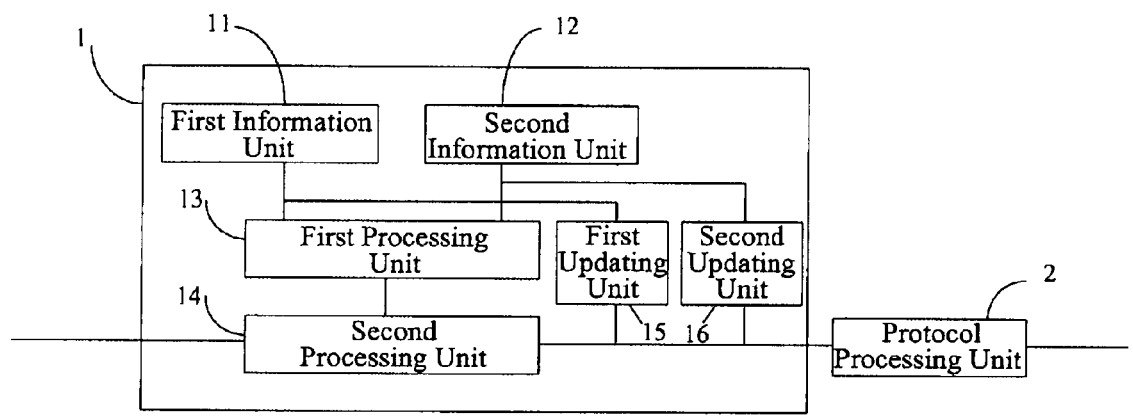
FIG. 4 is block diagram of a device for controlling the communication border security according to another embodiment of the present invention.

FIG. 4 discloses another device for controlling the communication border security. In comparison with the device shown in FIG. 3, a second processing unit 14 is added to the device of FIG. 4 to perform the signaling security detection and the terminal validity detection on a signaling packet sent by an unregistered user. If the detection is OK, the signaling packet passes the security processing; otherwise, the signaling packet is discarded. Additionally, the device shown in FIG. 4 further includes a first updating unit 15 adapted to update an active session information table according to the processing result of a media packet output from the protocol processing unit, and a second updating unit 16 adapted to update a registered user information table according to the processing result of a signaling packet output from the protocol processing unit.

Referring to FIG. 1, the system for controlling the communication border security is provided by an embodiment of the present invention. The system includes: a border security controller arranged between a soft switching or other communication servers and a terminal; and a security policy server. Wherein, the border security controller may employ any device shown in FIG. 3 or FIG. 4. Because the embodiment of the border security controller has been illustrated above in detail, it will not be described again here.

While the preferred embodiments of the present invention have been described as above, it shall be appreciated that the scope of the present invention shall not be limited thereto, and those skilled in the art can make various variations and modifications to the embodiments without departing from the scope of the present invention. Thus, it is intended that all such variations and modifications shall fall within the scope of the present invention as solely defined in the claims thereof.

What is claimed is:

1. A method for controlling a communication border security, the method comprising:
performing a security processing on a data packet, wherein the data packet comprises a media packet and a signaling packet; and
performing a protocol processing on the data packet if the data packet passes the security processing;
wherein the security processing performed on the data packet comprises:
determining a type of the data packet;
if the data packet is the media packet, querying whether a corresponding active session record exists in an active session information table, if yes, determining that the media packet passes the security processing; if no, discarding the media packet, wherein the corresponding active session record comprises a media channel address, a calling number, a calling ID, a called number and a called ID; and
if the data packet is the signaling packet, querying a registered user information table to determine whether the signaling packet is a signaling packet sent by a registered user, if yes, determining that the signaling packet passes the security processing.

2. The method according to claim 1, wherein the method further comprises:
performing a signaling security detection on a signaling packet sent by an unregistered user, if the signaling security detection is passed, the signaling packet passes the security processing; if the signaling security detection is not passed, the signaling packet is discarded.

3. The method according to claim 1, wherein the method further comprises:
if the data packet is the media packet, updating the active session information table according to a protocol processing result after the protocol processing is performed on the media packet; and if the data packet is the signaling packet, updating the registered user information table according to the protocol processing result after the protocol processing is performed on the signaling packet.

4. A method for controlling a communication border security, the method comprising:
performing a security processing on a data packet, wherein the data packet comprises a media packet and a signaling packet; and
performing a protocol processing on the data packet if the data packet passes the security processing;
wherein the security processing performed on the data packet comprises:
determining a type of the data packet;
if the data packet is the media packet, querying whether a corresponding active session record exists in an active session information table, if yes, the media packet passes the security processing; otherwise, the media packet is discarded, wherein the corresponding active session record comprises a media channel address, a calling number, a calling ID, a called number and a called ID; and
if the data packet is the signaling packet, querying a registered user information table to determine whether the signaling packet is the signaling packet sent by a registered user; if the signaling packet is the signaling packet sent by the registered user, performing an integrity detection and a source authentication on the signaling packet sent by the registered user; and
if the signaling packet sent by the registered user has not passed the integrity detection and the source authentication, the signaling packet is discarded.

5. The method according to claim 4, wherein the method further comprises:
performing a signaling security detection and a terminal validity detection on a signaling packet sent by an unregistered user, if the security signaling detection is passed, the signaling packet passes the security processing; otherwise the signaling packet is discarded.

6. The method according to claim 4, wherein the method further comprises:
if the data packet is the media packet, updating the active session information table according to a protocol processing result after the protocol processing is performed on the media packet; and
if the data packet is the signaling packet, updating the registered user information table according to the protocol processing result after the protocol processing is performed on the signaling packet.

7. A device for controlling a communication border security, comprising:
a detecting unit adapted to perform a security processing on a data packet, wherein the data packet comprises a media packet and a signaling packet; and
a protocol processing unit adapted to perform a protocol processing on a data packet has passed the security processing,
wherein the detecting unit is configured to:
if the data packet is the media packet, query whether a corresponding active session record exists in an active session information table, if yes, the media packet passes the security processing; otherwise, the media packet is discarded, wherein the corresponding active session record comprises: media channel address, calling number, calling ID, called number and called ID; and if the data packet is the signaling packet, query the registered user information table to determine whether the signaling packet is the signaling packet sent by a registered user, if yes, the signaling packet passes the security processing.

8. The device according to claim 7, wherein the detecting unit further comprises:
a second processing unit adapted to perform a signaling security detection and a terminal validity detection on a signaling packet sent by an unregistered user, if the signaling packet sent by the unregistered user does not pass the signaling security detection and the terminal validity detection, the signaling packet is discarded.

9. The device according to claim 8, wherein the device further comprises:
a first updating unit adapted to update the active session information table according to a processing result for the media packet output from the protocol processing unit; and
a second updating unit adapted to update the registered user information table according to the processing result for the signaling packet output from the protocol processing unit.

10. A device for controlling a communication border security, comprising:
a detecting unit adapted to perform a security processing on a data packet, wherein the data packet comprises a media packet and a signaling packet; and
a protocol processing unit adapted to perform a protocol processing on a data packet has passed the security processing;
wherein the detecting unit is configured to:
if the data packet is the media packet, query whether a corresponding active session record exists in an active session information table, if yes, the media packet passes the security processing; otherwise, the media packet is discarded, wherein the corresponding active session record comprises a media channel address, a calling number, a calling ID, a called number and a called ID; and
if the data packet is the signaling packet, query the registered user information table to determine whether the signaling packet is the signaling packet sent by a registered user; if the signaling packet is the signaling packet sent by the registered user, perform an integrity detection and a source authentication on the signaling packet sent by the registered user; if the signaling packet sent by the registered user does not pass the authentication, the signaling packet is discarded.

11. The device according to claim 10, wherein the detecting unit further comprises:
a second processing unit adapted to perform a signaling security detection and a terminal validity detection on a signaling packet sent by an unregistered user, if the signaling packet sent by the unregistered user does not pass the signaling security detection and the terminal validity detection, the signaling packet is discarded.

12. A system for controlling a communication border security, comprising a border security controller arranged between a soft switching and a terminal, wherein the border security controller comprises:
a detecting unit adapted to perform a security processing on a data packet; and
a protocol processing unit adapted to perform a protocol processing on the data packet has passed the security processing;
a security policy server, in communication with the border security controller, adapted to provide a security policy to the border security controller;
a first updating unit, adapted to update an active session information table according to a processing result for the media packet output from the protocol processing unit; and
a second updating unit, adapted to update a registered user information table according to the processing result for the signaling packet output from the protocol processing unit;
wherein the corresponding active session record in the active session information table comprises: media channel address, calling number, calling ID, called number and called ID.

13. The system for controlling the communication border security according to claim 12, wherein the border security controller and the security policy server are arranged separately.

* * * * *